United States Patent
Puchtler (10) Patent No.: US 7,212,945 B2
(45) Date of Patent: May 1, 2007

(54) METHOD FOR DETERMINING ACTUAL STATES OF A NUMBER OF ADJUSTING ELEMENTS

(75) Inventor: Thomas Puchtler, Adelsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/877,385

(22) Filed: Jun. 25, 2004

(65) Prior Publication Data

US 2004/0267475 A1 Dec. 30, 2004

(30) Foreign Application Priority Data

Jun. 27, 2003 (DE) .............. 103 29 148
Aug. 20, 2003 (DE) .............. 103 38 302

(51) Int. Cl.
G06F 15/00 (2006.01)

(52) U.S. Cl. .................................... 702/150
(58) Field of Classification Search .............. 702/150
See application file for complete search history.

(56) References Cited

U.S. PATENT DOCUMENTS

| | | | | |
|---|---|---|---|---|
| 6,099,217 | A * | 8/2000 | Wiegand et al. | 409/201 |
| 6,157,157 | A * | 12/2000 | Prentice et al. | 318/625 |
| 6,328,510 | B1 * | 12/2001 | Hanrath et al. | 409/235 |
| 6,430,476 | B1 | 8/2002 | Schwaar et al. | |
| 6,785,624 | B2 * | 8/2004 | Stengele | 702/94 |

FOREIGN PATENT DOCUMENTS

| | | |
|---|---|---|
| DE | 198 28 181 A1 | 12/1999 |
| DE | 198 18 635 C2 | 3/2000 |
| DE | 103 38 302 * | 11/2005 |
| EP | 0 411 139 A | 6/1991 |
| EP | 1 302 285 A2 | 4/2003 |

OTHER PUBLICATIONS

German Patent Office Communication, dated Apr. 16, 2004, issued in DE 103 38 302 A1.
European Search Report dated Nov. 25, 2004, issued in EP 1493538.
Jeha Ryu et al., "A New Method for Fully Autonomous Calibration of Parallel Manipulators Using a Constraint Link," International Conference on Advanced Intelligent Mechatronics Proceedings, pp. 141-146, Jul. (2001).

(Continued)

Primary Examiner—Michael Nghiem
(74) Attorney, Agent, or Firm—White & Case LLP (57) ABSTRACT

The present invention is directed to a method for determining actual states of a number of adjusting elements. A position of an additional member relative to a basic member can be set by means of a number of adjusting elements. In order to determine the actual states of the adjusting elements, the additional member is firstly fixed mechanically relative to the basic member in such a way that it has only one degree of freedom. It is then possible to describe the position of the additional member relative to the basic member by means of a single scalar variable. The position of the additional member is then changed. Changes in state effected by the change in position of the additional member are detected, and the actual states of the adjusting elements are determined therefrom.

17 Claims, 4 Drawing Sheets

OTHER PUBLICATIONS

Hanqi Zhuang, "Self-Calibration of Parallel Mechanisms with a Case Study on Stewart Platforms," IEEE Transactions on Robotics and Automation, vol. 13, No. 3, pp. 387-397, (1997).

John M. Hollerbach et al., "The Calibration Index and Taxonomy for Robot Kinematic Calibration Methods," The International Journal of Robotics Research, vol. 15, No. 6, pp. 573-591, (1996).

K. Rall et al., "Roboterkoordinatensystem-Ursprungsbestimmung mit Hilfe der robotereigenen Sensorik unter Berücksichtigung des Genauigkeitsverhaltens," (Robot coordinate system origin regulation with the help of the robot-own sensor technology under consideration for accuracy behavior), (1992). (English-language abstract is provided).

English Abstract to DE 198 28 181, published Dec. 30, 1999, Thomas Puchtler.

English Abstract to DE 198 18 635, published Mar. 23, 2000, Manfred Weck et al.

English Abstract to EP 1 302 285, published Apr. 16, 2003, Gunter Schreiber et al.

* cited by examiner

FIG 1

METHOD FOR DETERMINING ACTUAL STATES OF A NUMBER OF ADJUSTING ELEMENTS

FIELD OF THE INVENTION

The present invention relates to a determining method for actual states of a number of adjusting elements by means of which it is possible to set a position of an additional member relative to a basic member.

BACKGROUND OF THE INVENTION

With machine tools, manipulating devices and robots, it happens that the driven components (i.e., adjusting elements) are not arranged at right angles to one another. To be operated, such machines require a so-called kinematic coordinate transformation which converts spatial coordinates (as a rule, Cartesian coordinates, in individual cases, also cylindrical or spherical coordinates) into desired values for the machine axes. In these machines, the accuracy of positioning is a function of a multiplicity of factors.

Thus, in particular the parameters of the kinematic transformation must be accurately known. Furthermore, the mathematical model for describing the kinematic transformation should be as complete as possible. Finally, the actual states of the adjusting elements must be exactly known.

The geometric parameters of the kinematic transformation comprise, inter alia, spatial coordinates of midpoints of links, and the mutual spacing of links. Such measurements are carried out as a rule on coordinate measuring machines. The parameters of the kinematic transformation, that is to say the positions of points of the basic member relative to one another, and the positions of points of the additional member relative to one another, can therefore be detected with sufficient accuracy as a rule. However, once these parameters have been detected, it is also still necessary to determine the actual states of the adjusting elements with high accuracy. This frequently constitutes a large problem in starting up a machine. The point is that in the overwhelming number of applications, it is necessary for the actual state to be exactly known in order to be able to adjust the additional member correctly. In the assembled state of the machine, however, the link midpoints are no longer accessible as a rule to direct measurement.

It is conceivable to set the actual states in repeated trials so that the positional accuracy of the additional member in the working space is as high as possible. However, this method is complicated and, moreover, not very accurate.

DE 198 28 181 A1 discloses a method for calibrating the kinematics. In this method, comparisons are made in the entire working space between a measured position and detected actual positions, and the parameters and the actual states of the adjusting elements are determined in such a way that the mean square error is minimized. This method also has only a limited accuracy and is, moreover, very complex mathematically.

SUMMARY OF THE INVENTION

The object of the present invention is to specify a determining method for actual states of a number of adjusting elements which operates simply, reliably, quickly and with high accuracy.

The object is achieved by virtue of the fact that the additional member is fixed mechanically relative to the basic member in such a way that it has only one degree of freedom such that the position of the additional member relative to the basic member can be described by means of a single scalar variable, that the position of the additional member is changed after fixing the latter, and changes effected thereby in the state of the adjusting elements are detected by means of state sensors assigned to the adjusting elements, and that the actual states of the adjusting elements are determined with the aid of the changes in state of the adjusting elements.

The determination of the actual states is preferably performed in the following way that, a first transformation function is determined that specifies for a first of the adjusting elements which change in state occurs for a prescribed value of the variable and a prescribed change in the variable. The first transformation function and the change in state detected for the first adjusting element are used to determine a correlation function that specifies which change in the variable occurs for a prescribed value of the variable and the detected change in state of the first adjusting element. The correlation function is used to determine at least one further transformation function that specifies for a further one of the adjusting elements which change in state occurs for a prescribed value of the variable and of the detected change in state of the first adjusting element. A final value of the variable is determined for which the change in state determined with the aid of the at least one further transformation function corresponds to the detected change in state of the at least one further adjusting element. The final value is used to determine the position of the additional member relative to the basic member, and the actual states of the adjusting elements are determined therefrom.

When the number of adjusting elements is at least three (which is mostly the case), the determination of the final value is preferably performed as follows: Firstly, at least one satisfying value of the variable is determined for which the change in state determined with the aid of a first of the further transformation functions corresponds to the detected change in state of corresponding adjusting element. It is then determined by comparing the changes, determined for the satisfying value, in the state of the other ones of the further transformation functions with the detected changes in state of the corresponding adjusting elements whether the satisfying value is the final value.

The satisfying values can be determined in a particularly simple fashion in this case when an auxiliary function is formed from the difference between the change in state determined with the aid of the first of the further transformation functions and the detected change in state of the corresponding adjusting element, and at least one zero of the auxiliary function is determined.

The zero can be determined in any desired way. Such methods are familiar to any person skilled in the art. It need only be pointed out that the auxiliary function is an ordinary function dependent on a single scalar variable. The zero can therefore be determined, for example, using the generally known Newton method, or in accordance with the so-called regula falsi.

When the auxiliary function is divided by the difference between the variable and determined zero, and the auxiliary function divided by the difference between the variable and determined zero takes the place of the original auxiliary function, all the zeros of the auxiliary function can be determined with certainty.

When the determination of the zeros of the auxiliary function is terminated, and a satisfying value is determined for which the changes in state determined with the aid of the other ones of the further transformation functions corresponds to the determined changes in state of the corresponding adjusting elements, the outlay on determining the final value, and thus the actual states of the adjusting elements is minimum. Again, the determining method then operates particularly quickly.

As a rule, the adjusting elements are assigned controlled-displacement drives by means of which the adjusting elements can be adjusted. In this case, with the exception of a single drive, the drives are preferably switched into a tracking mode, and the change in the position of the additional member is performed by adjusting that one of the adjusting elements whose assigned drive is not switched into the tracking mode.

The actual states of the adjusting elements can—at least partially—be lengths or angles of the adjusting elements, positions of the adjusting elements relative to the basic member, and positions of the adjusting elements relative to the additional member.

The position of the additional member relative to the basic member can comprise a position and/or an orientation of the additional member relative to the basic member. The degree of freedom can be a rotary or a translatory degree of freedom.

When the number of adjusting elements is three, the determining method according to the invention can be applied, for example, with a so-called tripod. However, it can also be applied in principle with a hexapod, for example, in which the number of adjusting elements is six.

The position of the additional member need not be patently changed. It suffices when the change in the position of the additional member is performed differentially.

BRIEF DESCRIPTION OF THE DRAWINGS

Further advantages and details emerge from the following description of an exemplary embodiment in conjunction with the drawings.

DETAILED DESCRIPTION OF THE INVENTION

Figure 1:
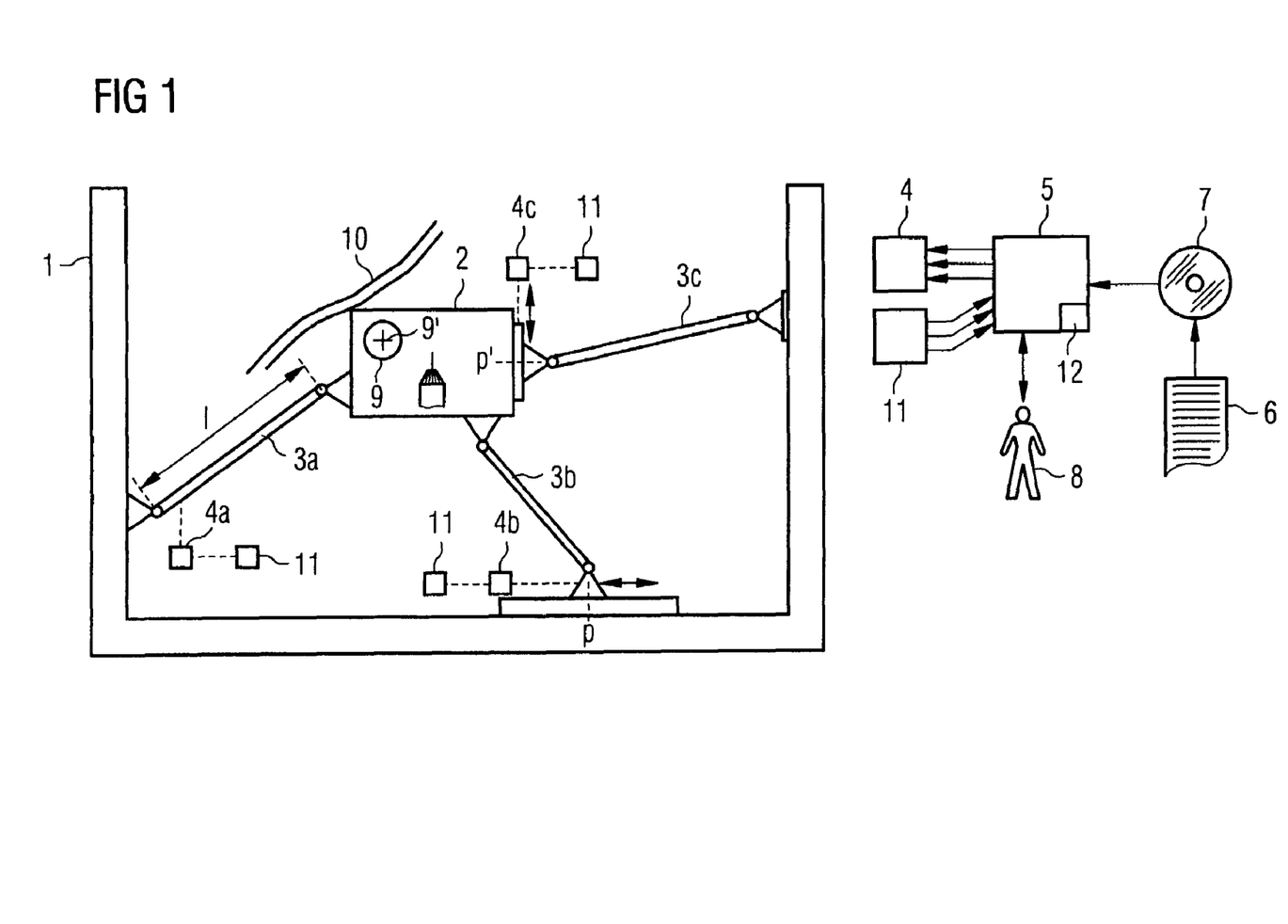
FIG. 1 shows a schematic of a production machine according to an embodiment of an aspect of the present invention.

In accordance with the embodiment of an aspect of the present invention illustrated in FIG. 1, a production machine has a basic member 1 and an additional member 2. The additional member 2 is connected to the basic member 1 via a number of adjusting elements 3. In accordance with FIG. 1, the number of adjusting elements 3 is three. This also constitutes the minimum number of adjusting elements 3, as a rule. In order to distinguish the adjusting elements 3 from one another, the adjusting elements 3 are denoted, where necessary, below as adjusting element $3a$, adjusting element $3b$ and adjusting element $3c$.

In accordance with FIG. 1, the adjusting elements 3 are connected to the basic member 1 and the additional member 2 in an articulated fashion. The adjusting element $3a$ can be longitudinally displaced in this case. As with regards to the adjusting element $3a$, the length "l" thereof, therefore, constitutes an actual state Z of this adjusting element $3a$. Alternatively, its angle could be adjustable, for example.

The lengths of the adjusting elements $3b$ and $3c$ are fixed. In the case of the adjusting element $3b$, by contrast, its position p can be varied relative to the basic member 1. The position of the adjusting element $3c$ can be adjusted relative to the additional member 2. Thus, with reference to the adjusting elements $3b$ and $3c$ the positions p, p' constitute actual states Z of the respective adjusting elements $3b$, $3c$.

The illustration in accordance with FIG. 1 is purely exemplary in this case. Of course, any other desired combinations of the actual states Z could take place. For example, it could be possible to adjust the length of all three adjusting elements 3, or to position them relative to the basic member 1.

The actual states Z of the adjusting elements 3 fix a position and an orientation of the additional member 2 relative to the basic member 1—denoted below to the extent required as actual states Za, Zb and Zc for the sake of distinction. A position of the additional member 2 relative to the basic member 1 can be set by means of the adjusting elements 3. The relationship between the actual states Z and the position is preferably unique in this case. Thus, the position of the additional member 2 can be used to determine the actual states Z, and the position of the additional member 2 can be determined from the actual states Z.

As is indicated in FIG. 1 symbolically by a drill chuck and a drill, the additional member 2 is, for example, a tool carrier 2 of a machine tool. More generally, it can also be regarded as a moving machine element 2 of a production machine. It must be positioned with high accuracy—in terms of both translation and of rotation, as a rule. This is performed via controlled-displacement drives 4 that are assigned to the adjusting elements 3. The drives 4 can be used to adjust the adjusting elements 3, and thus to change the position of the additional member 2. The positioning of the adjusting members 3 by means of the drives 4 is performed as a rule in this case with an accuracy of approximately 1 µm, that is to say with high accuracy.

The drives 4 are driven by a control and evaluation device 5, for example a numerical controller 5. It is programmed with the aid of a computer program 6. The computer program 6 is fed in this case to the control and evaluation device 5 via a data medium 7, for example a CD-ROM 7, on which the computer program 6 is stored in (exclusively) machine-readable form. The control and evaluation device 5 operates in the way described in more detail below in conjunction with FIG. 2 on the basis of the programming with the aid of the computer program 6.

Figure 2:
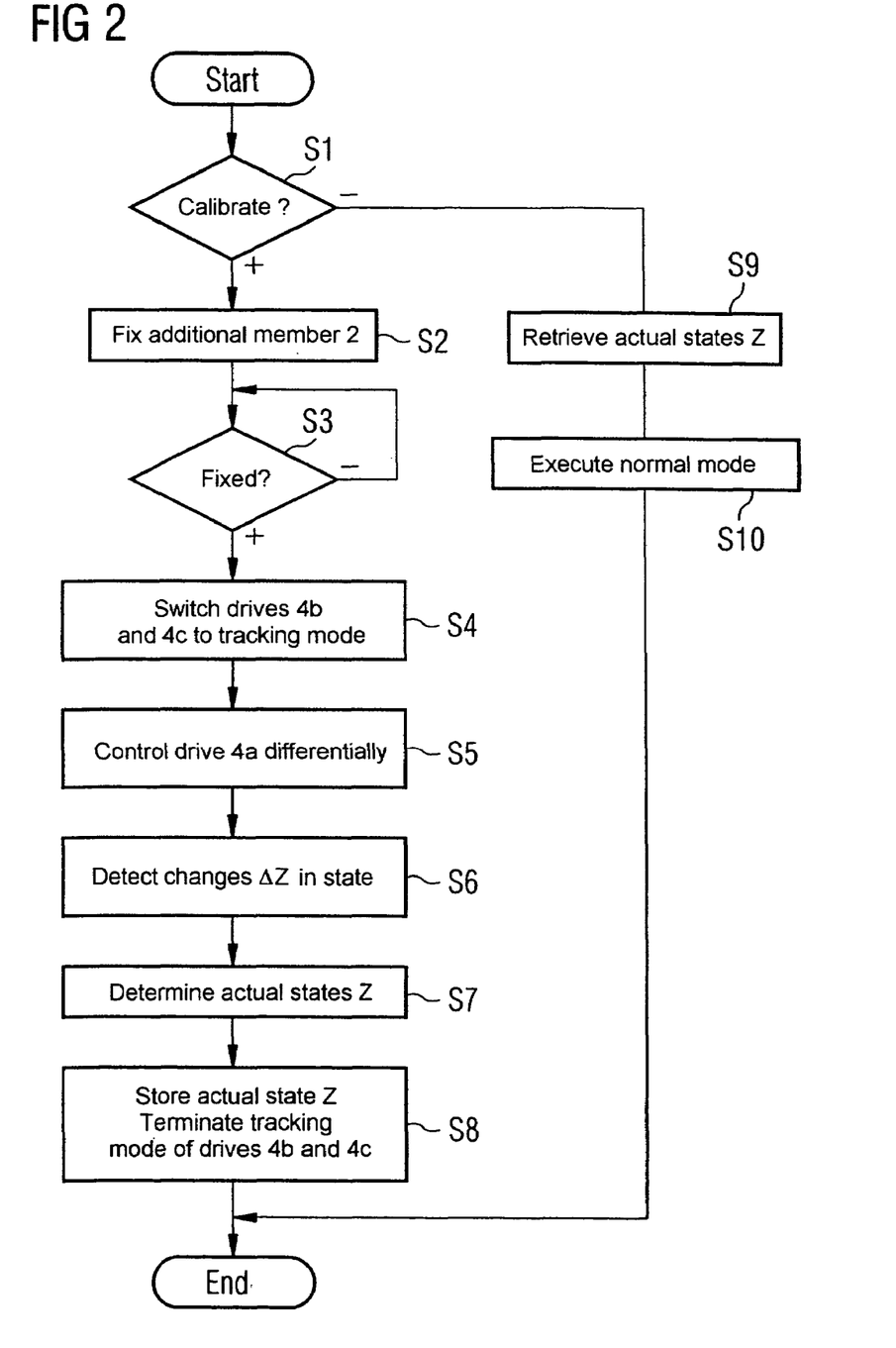
FIGS. 2 and 3 show flowcharts according to embodiments of aspects of the present invention.

In accordance with FIG. 2, the control and evaluation device 5 firstly checks in step S1 whether it has been given a command for calibrating the machine. If this is the case, the control and evaluation device 5 branches to step S2 in which it demands that the additional member 2 be fixed mechanically relative to the basic member 1. This fixing is undertaken by an operator 8, as a rule. The mechanical fixing is performed in this case in such a way that the additional member 2 has only one degree of freedom. The position of the additional member 2 relative to the basic member 1 can therefore be described after the fixing by means of a single scalar variable $\alpha$.

In accordance with FIG. 1, it is possible, for example, to use a bolt 9 to fix a predetermined point of the additional member 2 in such a way that the additional member 2 can rotate only about a bolt axis 9'. In this case, the degree of freedom is a rotatory degree of freedom, specifically a rotation about the bolt axis 9'.

As an example, let an arbitrary point of the bolt axis 9' be the origin both of a Cartesian coordinate system of the basic member 1, and of a Cartesian coordinate system of the additional member 2. Furthermore, let v be a vector of unit length that runs parallel to the bolt axis 9'. It is then possible for an arbitrary point P of the basic member coordinate system to be converted into a point P' of the additional member coordinate system by means of a simple matrix operation. The computing operation is then P'=M·P.

The matrix M is a function in this case only of the angle of rotation α. α is therefore a variable that can be used to describe the position of the additional member 2 relative to the basic member 1.

The matrix M is:

$$M(\alpha) = \begin{bmatrix} v_x^2 + \cos(\alpha)(v_y^2 + v_z^2) & v_x v_y (1 - \cos(\alpha)) - v_z \sin(\alpha) & v_x v_z (1 - \cos(\alpha)) + v_y \sin(\alpha) \\ v_x v_y (1 - \cos(\alpha)) + v_z \sin(\alpha) & v_y^2 + \cos(\alpha)(v_x^2 + v_z^2) & v_y v_z (1 - \cos(\alpha)) - v_x \sin(\alpha) \\ v_x v_z (1 - \cos(\alpha)) - v_y \sin(\alpha) & v_y v_z (1 - \cos(\alpha)) + v_z \sin(\alpha) & v_z^2 + \cos(\alpha)(v_x^2 + v_z^2) \end{bmatrix}$$

If the angle of rotation α (the variable α) is known, it is thereby possible to convert coordinates of fastening points of the adjusting elements 3 from the additional member coordinate system to coordinates of the basic member coordinate system, and vice versa. Consequently, the coordinates of corresponding fastening points, for example the fastening points of the adjusting element 3a, can be expressed in the same coordinate system. It is thereby also possible, for example, to determine the length I of the adjusting element 3a on the basis of knowing both end points in the same coordinate system.

However, as indicated by dashes in FIG. 1, it would also be conceivable to fasten the additional member 2 on a guide rail 10. In this case, the degree of freedom would be a translatory degree of freedom, specifically a displacement along the guide rail 10. In the case of a translatory degree of freedom, as well, it is possible to undertake a coordinate conversion in the same way as with a rotatory degree of freedom.

Step S3 is executed after step S2. In step S3, the control and evaluation device 5 waits until the fixing of the additional member 2 is concluded. For example, it can wait in step 3 until it receives a confirmation input from the operator 8.

After step S3, the control and evaluation device 5 executes step S4. In step S4, two of the drives 4, for example drives 4b and 4c, are switched into a tracking mode. Only a single drive 4, here the drive 4a, is not switched into the tracking mode.

The control and evaluation device 5 then exerts differential control on drive 4a in step S5. The actual state Za is thereby changed differentially. The position of the additional member 2 is also changed differentially by this differential change to the actual state Za. For example, the member 2 is rotated slightly about the bolt 9 or displaced along the guide rail 10. The actual states Zb, Zc of the other adjusting elements 3b, 3c are also changed differentially by this change in the position of the additional member 2.

The changes in state ΔZ are detected by the control and evaluation device 5 in step S6. The detection is performed in this case, for example, by position sensors 11 that are assigned to the drives 4 and thus, indirectly, also to the adjusting elements 3.

In step S7, the control and evaluation device 5 then uses the detected changes ΔZ in state of the adjusting elements 3 to determine the actual states Z of the adjusting elements 3. More detail will be given on this step S7 later in conjunction with FIG. 3. The determined actual states Z are finally stored in a memory 12, in step S8, and the tracking mode of drives 4b and 4c is terminated. The sequence of the steps S2 to S7, therefore, corresponds to a determining method in which the actual states Z of the adjusting elements 3 are determined.

If, in step S1, the control and evaluation device 5 is not given any command for calibrating the machine, it branches to a step S9. In the step S9, it retrieves the actual states Z—then assumed to be known—from the memory 12. It then transfers into the normal mode in step S10.

The determination of the actual states Z with the aid of the detected changes ΔZ in state (i.e., step S7) will now be explained in more detail below in conjunction with FIG. 3.

Figure 3:
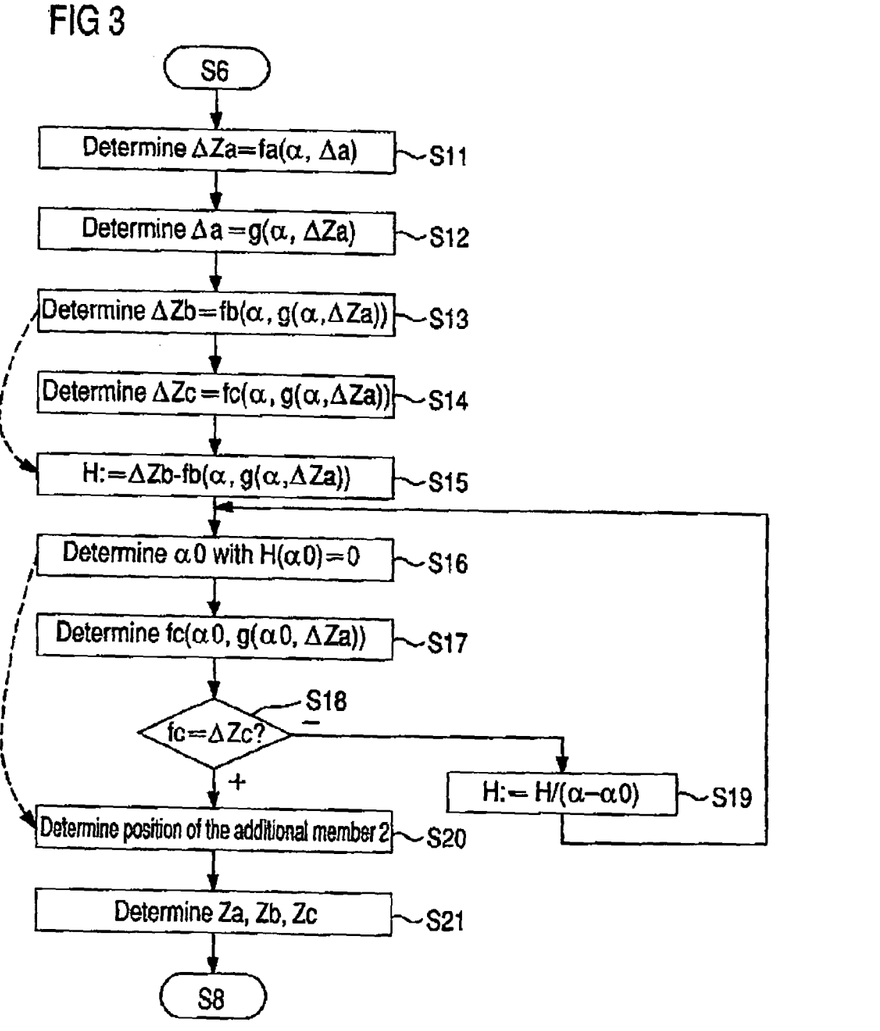

In accordance with FIG. 3, a first transformation function fa is initially determined in a step S11. The first transformation function fa specifies for one of the adjusting elements 3, for example the adjusting element 3a, which change ΔZa in state occurs when a prescribed change Δα in the variable a occurs for a prescribed value of the variable α.

Such transformation functions fa are customary and generally known. They are required, inter alia, in order to be able to prescribe changes ΔZ in state or new actual states Z correctly, given known actual states Z such that a desired position of the additional member 2 relative to the basic member 1 is assumed.

It is, therefore, possible to determine a correlation function g in a step S12 with the aid of the first transformation function fa (α, Δα) and the detected change ΔZa in state of the first adjusting element 3a. The correlation function g specifies which change Δα in the variable a occurs for a prescribed value of the variable α and of the detected change ΔZa in state of the first adjusting element 3a.

It is also possible to determine the correlation function g straightaway. The point is that the transformation functions f are known—see above—and so the change Δα can be determined directly as a function of the variable α by substitution and iterative approximation for a given change ΔZa in state.

Consequently, a second transformation function fb can be determined in step S13 by using the correlation function g (α,ΔZa). The second transformation function fb specifies for a second one of the adjusting elements 3, for example the adjusting element 3b, which change ΔZb in state occurs for a prescribed value of the variable α and of the detected change ΔZa in state of the first adjusting element 3a. It is possible in the same way in step S14 to determine a third transformation function fc for the one of the adjusting elements 3 that still remains, here the adjusting element 3c.

In a subsequent step S15, the control and evaluation device 5 uses the difference between the second transformation function fb and the detected change ΔZb in state of the second adjusting element 3b to form an auxiliary function H.

As for any other function dependent on only a single scalar variable, it is, therefore, possible, in step S16, to determine a zero Δ0 for this auxiliary function H that depends only on the variable α. The zero α0 can be determined, for example, in accordance with the generally known Newton method, or in accordance with the likewise generally known regula falsi, or else in accordance with the interval division method, for example.

The zero α0 thus determined is a satisfying value α0 of the variable α for which the change in state determined with the aid of the second transformation function fb corresponds to the detected change ΔZb in state of the second adjusting element 3b. This satisfying value α0 is therefore inserted in step S17 into the third transformation function fc. A check is then made in step S18 as to whether the change in state determined with the aid of the third transformation function fc also corresponds for this satisfying value α0 to the detected change ΔZc in state of the third adjusting element 3c.

If there is no correspondence, in a step 19 the auxiliary function H is divided by the difference between the variable α and the detected zero α0, thus determining a new auxiliary function H that takes the place of the original auxiliary function H. Thereafter, there is a jump back to the step S16.

When, by contrast, the check in the step S18 yields a correspondence, the satisfying value α0 is determined as the final value α0. In this case, the position of the additional member 2 relative to the basic member 1 is determined in step S20 with the aid of the final value α0. The actual states Z of the adjusting elements 3 can then be determined in step S21 with the aid of the position, now known, of the additional member 2 relative to the basic member 1. It is therefore no longer necessary to determine further satisfying values α0. However, it is possible to terminate the determination of the zero α0 of the auxiliary function H.

It was described above in conjunction with FIGS. 1 to 3 how the actual states Z of the adjusting elements 3 can be determined when three adjusting elements 3 are present. Thus, a description was given of a determining method for the actual states Z of the adjusting elements 3 of a so called tripod. As a supplement, a method was described in which the additional member 2 has one rotatory and two translatory degrees of freedom relative to the basic member 1. Of course, however, other configurations are also possible and conceivable. For example—again given three adjusting elements 3—it is also possible for there to be one translatory and two rotatory degrees of freedom. It can also be that only one translatory movement or only one rotatory movement is possible.

In the general case, by comparison with the basic member 1, the additional member 2 even has both three translatory and three rotatory degrees of freedom. In this case, six adjusting elements 3 are required to set the position of the additional member 2 relative to the basic member 1. This is illustrated schematically in FIG. 4. However, in this application, as well, the mode of procedure described in conjunction with FIG. 3 remains valid without change. Only those ones of the steps S11 to S21 that relate to the further adjusting element 3c need be applied to a number of adjusting elements 3c to 3f. These adjusting elements 3c to 3f can, however, be handled separately from one another such that the relevant steps S14, S17, S18 and S21 are now executed repeatedly, specifically once in each case of the adjusting elements 3c to 3f.

Figure 4:
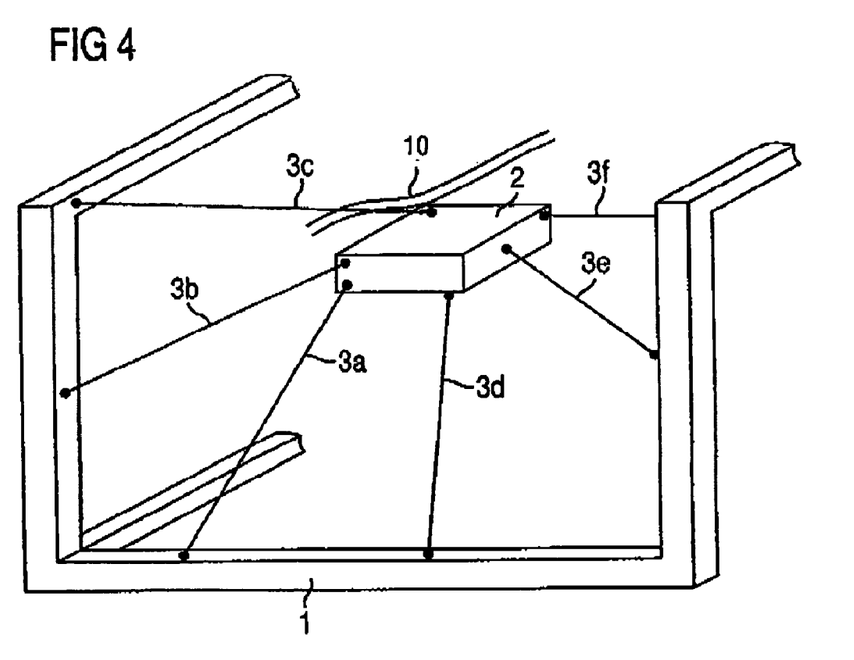
FIG. 4 shows a schematic of a further production machine according to an aspect of the present invention.

In order to carry out the determining method according to the invention, it is further necessary in the case of the exemplary embodiment in accordance with FIG. 4 for five of the drives to be switched over to the tracking mode and for the additional member 2 to be fixed in five degrees of freedom.

There are, inter alia, the following possibilities for fixing in five degrees of freedom: A rotary joint is mounted on the basic member 1, and the additional member 2 is fastened thereon. In this case, the additional member 2 has only one degree of freedom, specifically a rotation about this axis. A linear guide 10 is mounted in any desired alignment on the basic member 1. Thereafter, the additional member 2 is fastened on the linear guide in such a way that its orientation remains constant The additional member 2, therefore, has only one translatory degree of freedom, specificaiiy a movement in the direction of the guide.

The method according to the invention can even be applied with only two adjusting elements 3. The steps S14, S17, S18 and S19 can be eliminated in this case. As indicated in FIG. 3 by dashes, these steps can therefore be skipped in this case.

The advantages of the determining method according to the invention are many and varied. In particular, the highly accurate position sensors 11 which are present in any case inside the drives can be used to detect the changes ΔZ in state. Again, there is no need to execute complicated travel movements. Rather, it is sufficient, for example, to start a partial program in the case of a machine tool. Furthermore, the determining method according to the invention can be executed entirely automatically. Finally, the determining method according to the invention resorts in particular for the purpose of determining the transformation functions f and the correlation function g to the transformation formulas that are likewise stored in any case in the control and evaluation device 5. In particular, the expenditure of time in determining the actual states Z is very low for this reason. It is mostly in the region of a few milliseconds.

The invention claimed is:

1. A method for determining actual states of a plurality of adjusting elements for setting a position of an additional member relative to a basic member, the method comprising the steps of:
mechanically fixing the additional member relative to the basic member in such a way that the additional member comprises a single degree of freedom such that the position of the additional member relative to the basic member can be described by means of a single scalar variable;
changing the position of the additional member after mechanically fixing the additional member, and detecting changes in state associated with the plurality of adjusting elements, the detected changes in state detected by sensors;
determining the actual states of the plurality of adjusting elements based on the detected changes in state associated with the plurality of adjusting elements; and
storing the determined actual states in a memory for adjusting the additional member.

2. The method according to claim 1, wherein the degree of freedom is a rotary degree of freedom.

3. The method according to claim 1, wherein the degree of freedom is a translatory degree of freedom.

4. The method according to claim 1, wherein the number of adjusting elements is six.

5. The method according to claim 1, wherein the change in the position of the additional member is performed differentially.

6. A method for determining actual states of a plurality of adjusting elements for setting a position of an additional member relative to a basic member, the method comprising the steps of:

mechanically fixing the additional member relative to the basic member in such a way that the additional member comprises a single degree of freedom such that the position of the additional member relative to the basic member can be described by means of a single scalar variable;

changing the position of the additional member after mechanically fixing the additional member, and detecting changes in state associated with the plurality of adjusting elements, the detected changes in state detected by sensors;

determining the actual states of the plurality of adjusting elements based on the detected changes in state associated with the plurality of adjusting elements; and storing the determined actual states in a memory.

the method further comprising a first transformation function that specifics for a first one of the plurality of adjusting elements which change in state occurs for a prescribed value of the single scalar variable and a prescribed change in the single scalar variable, wherein the first transformation function and the change in state detected for the first one of the plurality of adjusting elements are used to determine a correlation function that specifies which change in the single scalar variable occurs for a prescribed value of the single scalar variable and the detected change in state of the first one of the plurality of adjusting elements; and wherein the correlation function is used to determine at least one further transformation function that specifies for a further one of the plurality of adjusting elements which change in state occurs for a prescribed value of the single scalar variable and the detected change in state of the first one of the plurality of adjusting elements, and a final value of the single scalar variable is determined for which the change in state determined with the aid of the at least one further transformation function corresponds to the detected change in state of the further one of the adjusting elements, and wherein the final value determines the position of the additional member relative to the basic member, and the actual states of the adjusting elements are determined therefrom; and adjusting the additional member based on the stored determined actual states.

7. The method according to claim 6, wherein at least one satisfying value of the single scalar variable is determined for which a change in state determined with the aid of a first of the at least one further transformation functions corresponds to the detected change in state of a corresponding adjusting element, and wherein it is determined by comparing the changes determined for the satisfying value in the state of the other ones of the at least one further transformation functions with the detected changes in state of the corresponding adjusting element whether die at least one satisfying value is the final value.

8. The method according to claim 7, wherein an auxiliary function is formed from the difference between the first of the at least one further transformation functions and the detected change in state of the corresponding adjusting element, and wherein at least one zero of the auxiliary function is determined in order to determine the satisfying value.

9. The method according to claim 8, wherein following the determination of the at least one zero, the auxiliary function is divided by the difference between the single scalar variable and the at least one determined zero, and the auxiliary function divided by the difference between the single scalar variable and the determined at least one zero takes the place of the auxiliary function.

10. The method according to claim 9, wherein the determination of the at least one zero of the auxiliary function is terminated and a satisfying value is determined for which the changes in state determined with the aid of the other ones of the at least one further transformation functions also corresponds to the detected changes in state of the corresponding adjusting elements.

11. The method according to claim 10, wherein the adjusting elements are assigned controlled-displacement drives for adjusting the adjusting elements, and with the exception of a single one of the controlled-displacement drives, other ones of the controlled-displacement drives are switched into a tracking mode, and a change in position of the additional member is performed by adjusting that one of the adjusting elements, associated with the single one of the controlled-displacement drives, for which the assigned single one of the drives is not switched into the tracking mode.

12. The method according to claim 11, wherein the actual states of the adjusting elements at least in part comprise one of the group consisting of lengths and angles of the adjusting elements.

13. The method according to claim 12, wherein the actual states of the adjusting elements are at least partially positions of the adjusting elements relative to the basic member.

14. The method according to claim 13, wherein the actual states of the adjusting elements are at least partially positions of the adjusting elements relative to the additional member.

15. The method according to claim 14, wherein the position of the additional member relative to the basic member comprises a position and/or an orientation of the additional member relative to the basic member.

16. A method for determining actual states of a plurality of adjusting elements for setting a position of an additional member relative to a basic member for a production machine comprising a machine tool, the method comprising the steps of:

mechanically fixing the additional member relative to the basic member in such a way that the additional member comprises a single degree of freedom such that the position of the additional member relative to the basic member can be described by means of a single scalar variable;

changing the position of the additional member after mechanically fixing the additional member, and detecting changes in state associated with the plurality of adjusting elements, the detected changes in state detected by sensors;

determining the actual states of the plurality of adjusting elements based on the detected changes in state associated with the plurality of adjusting elements; and programming a control device with a computer program stored on a data medium for carrying out the method of determining actual states of the plurality of adjusting elements for setting the position of the additional member relative to the basic member for the production machine comprising the machine tool, wherein the determined actual states are stored in a memory associated with the control device for adjusting additional member.

17. A method for determining actual states of a plurality of adjusting elements for setting a position of an additional member relative to a basic member for a production machine comprising a machine tool, the method comprising the steps of:
- mechanically fixing the additional member relative to the basic member in such a way that the additional member comprises a single degree of freedom such that the position of the additional member relative to the basic member can be described by means of a single scalar variable;
- changing the position of the additional member after mechanically fixing the additional member, and detecting changes in state associated with the plurality of adjusting elements, the detected changes in state detected by sensors;
- determining the actual states of the plurality of adjusting elements based on the detected changes in state associated with the plurality of adjusting elements; and
- programming a control device with a computer program stored on a data medium for carrying out the method of determining actual states of the plurality of adjusting elements for setting the position of the additional member relative to the basic member for the production machine comprising the machine tool, wherein the determined actual states are stored in a memory associated with the control device;
- the method further comprising a first transformation function that specifics for a first one of the plurality of adjusting elements which change in state occurs for a prescribed value of the single scalar variable and a prescribed change in the single scalar variable, wherein the first transformation function and the change in state detected for the first one of the plurality of adjusting elements are used to determine a correlation function that specifies which change in the single scalar variable occurs for a prescribed value of the single scalar variable and the detected change in state of the first one of the plurality of adjusting elements; and
- wherein the correlation function is used to determine at least one further transformation function that specifies for a further one of the plurality of adjusting elements which change in state occurs for a prescribed value of the single scalar variable and the detected change in state of the first one of the plurality of adjusting elements, and a final value of the single scalar variable is determined for which the change in state determined with the aid of the at least one further transformation function corresponds to the detected change in state of the further one of the adjusting elements, and wherein
- the final value determines the position of the additional member relative to the basic member, and the actual states of the adjusting elements are determined therefrom; and
- adjusting the additional member based on the stored determined actual states.

* * * * *